D. M. SANDERS.
GEAR CUTTING ATTACHMENT FOR MILLING MACHINES.
APPLICATION FILED OCT. 2, 1918.
1,314,706.
Patented Sept. 2, 1919.
2 SHEETS—SHEET 1.
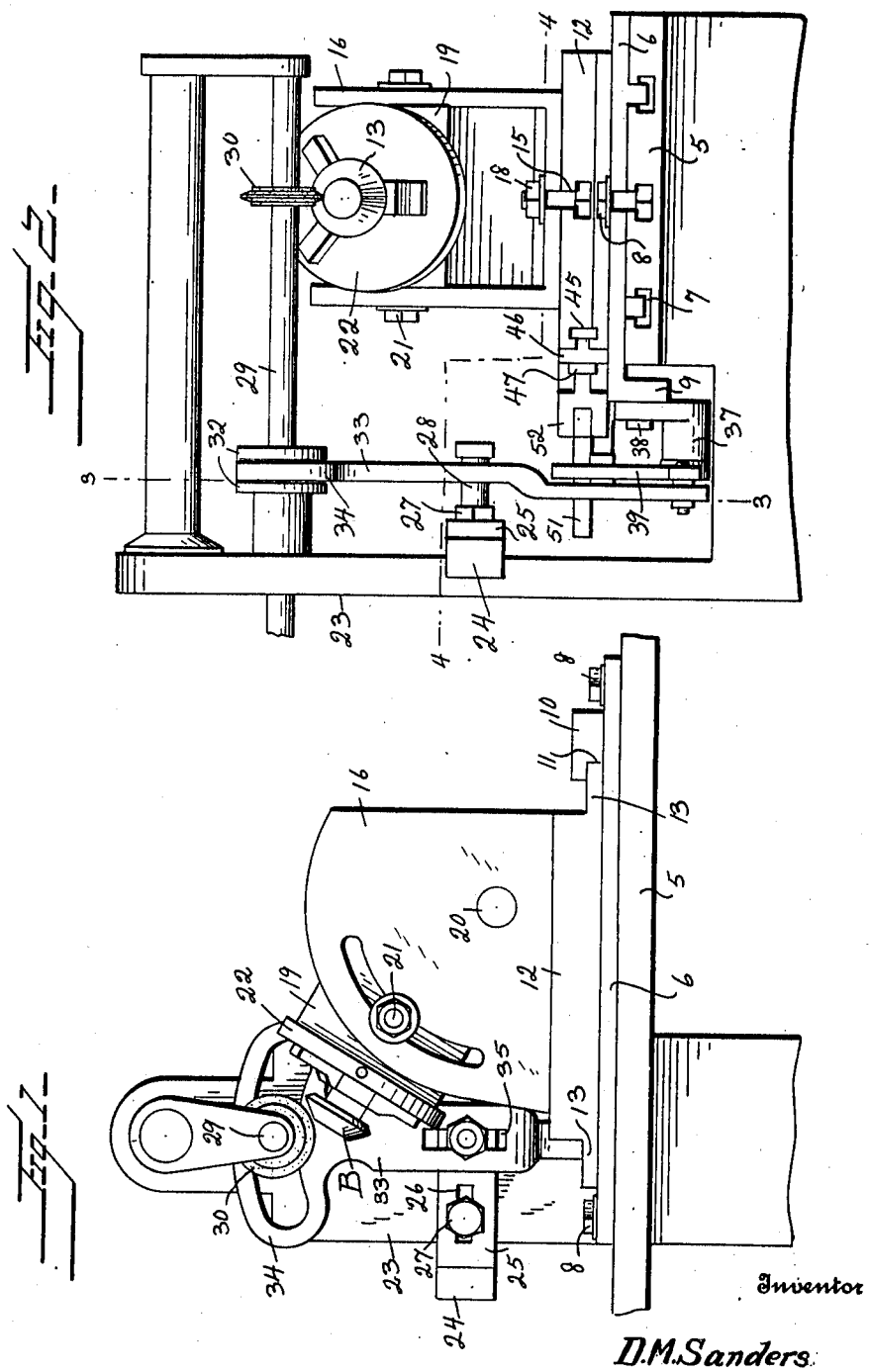
Inventor
D. M. Sanders.
By Watson E. Coleman
Attorney

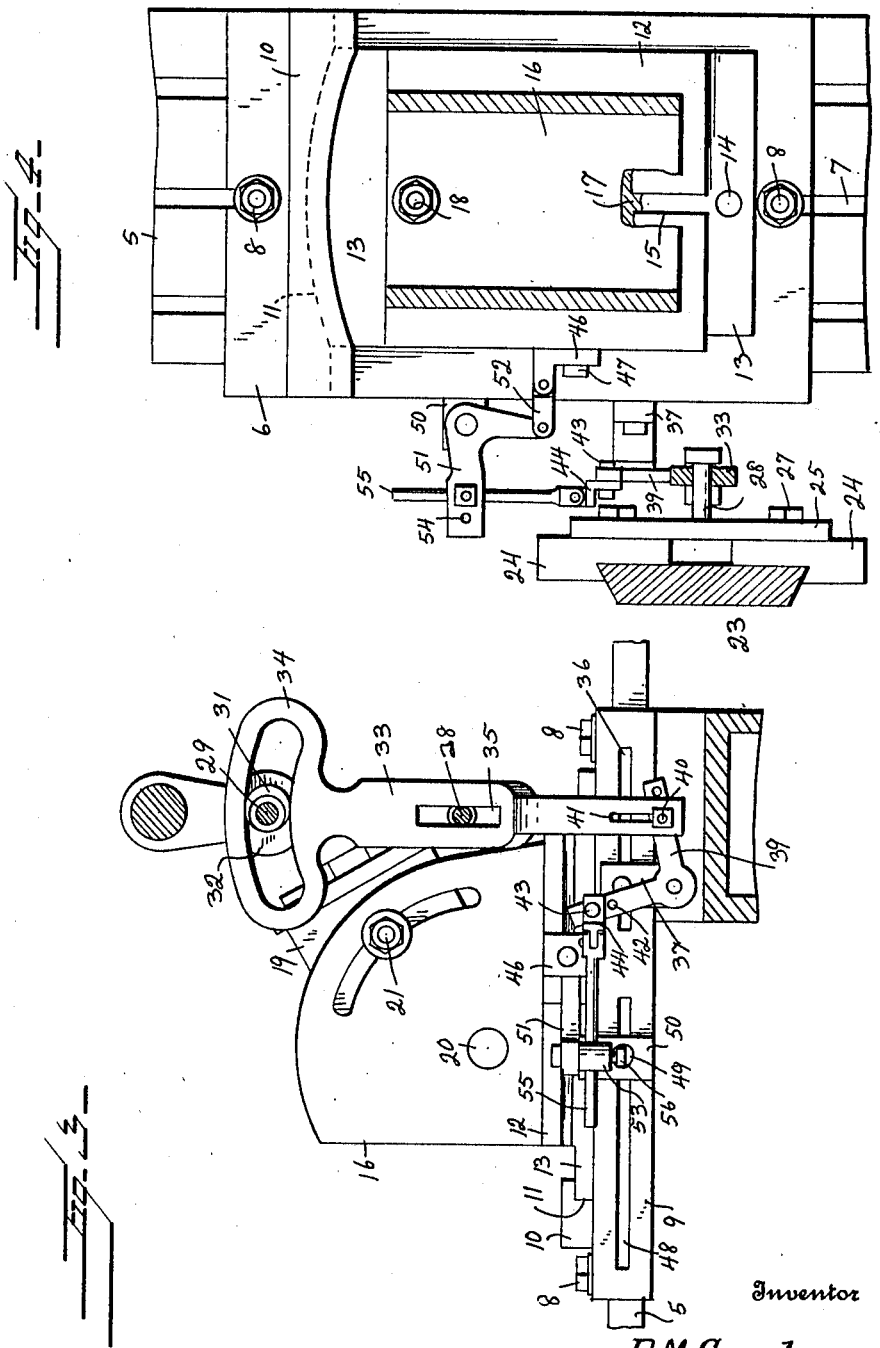

UNITED STATES PATENT OFFICE.

DAVIS M. SANDERS, OF WHITNEY, SOUTH CAROLINA.

GEAR-CUTTING ATTACHMENT FOR MILLING-MACHINES.

1,314,706.     Specification of Letters Patent.     Patented Sept. 2, 1919.

Application filed October 2, 1918. Serial No. 256,546.

*To all whom it may concern:*

Be it known that I, DAVIS M. SANDERS, a citizen of the United States, residing at Whitney, in the county of Spartanburg and State of South Carolina, have invented certain new and useful Improvements in Gear-Cutting Attachments for Milling-Machines, of which the following is a specification, reference being had to the accompanying drawings.

This invention relates to gear cutting attachments for milling machines, and has for its primary object to provide relatively simple means for accurately cutting bevel gear teeth in a very expeditious manner.

It is a more particular object of the invention to provide in combination with the sliding carriage of a milling machine having an index head pivotally mounted thereon, and carrying an adjustable blank holding chuck, a revoluble cutter for operating upon the blank, and means for shifting the index head transversely of the carriage, whereby the cut at the back end of the tooth is widened in a single cutting operation to produce a tooth of the proper taper.

It is another object of the invention to provide means actuated from the cutter spindle for shifting the pivotally mounted index head, said means including relatively adjustable parts whereby the extent of such movement may be varied and properly predetermined, in accordance with the variation in gear sizes.

It is also a further general object of my invention to provide a milling machine attachment as above characterized, the several parts of which are very durably constructed and may be readily assembled and applied to the ordinary milling machine.

With the above and other objects in view, my invention consists in the novel features of construction, combination, and arrangement of parts to be hereinafter more fully described, claimed and illustrated in the accompanying drawing, in which:—

Figure 1 is a side elevation illustrating the preferred embodiment of my improved gear cutting attachment applied to a milling machine;

Fig. 2 is an end elevation;

Fig. 3 is a section taken on the line 3—3 of Fig. 2; and

Fig. 4 is a section taken on the line 4—4 of Fig. 2, certain of the parts being broken away.

Referring in detail to the drawing, 5 designates the sliding carriage of a milling machine which is of the conventional construction and is adjusted in the usual manner upon the base of the machine. A plate 6 is formed upon its under side with ribs for engagement in the T slots 7 of the carriage and the opposite ends of this plate are notched or recessed to receive the clamping bolts 8 which are also adjustable in one of the carriage slots. By means of these bolts, the plate 6 may be securely clamped in its adjusted position upon the carriage. This plate is formed at one of its side edges with a longitudinally extending, downwardly projecting flange 9. A transversely extending cleat 10 is also formed upon or secured to the upper face of the plate 6 adjacent one of its ends and is provided with a concave arcuate shaped groove or rabbet 11 for a purpose to be presently explained.

A second metal plate 12 is arranged upon the plate 6 and is reduced at its opposite ends, as shown at 13. The plate 12 at its forward reduced end is pivoted to the plate 6 by means of the bolt 14 and the other reduced end of the plate 12 is movable in the rabbet or groove of the cleat 10. The plate 12 is centrally provided with a longitudinally extending T slot 15. An index head 16 is mounted upon said plate and the base thereof is provided upon its under side with a rib 17 having a sliding fit in said slot 15. Bolts 18 are also engaged in the base of the index head adjacent its opposite ends, and have sliding engagement in the slot. By means of suitable clamping nuts threaded upon these bolts, the head may be longitudinally adjusted with respect to the plate 12 and securely clamped in such adjusted position.

The index head is formed with spaced side plates between which an adjustable chuck carrying member 19 is pivotally mounted, as at 20, said side plates being provided with slots in concentric relation to the pivot, in which the ends of a clamping bolt 21 extending through the member 19 are engaged. By means of this bolt the chuck carrying member may be securely clamped in any desired angular position.

22 designates the rotatable chuck mounted upon the member 19, whereby the bevel gear blank shown at B, is secured in position with relation to the cutter. At one side of the milling machine the upright 23 is suitably mounted, said upright having chamfered edges with which the ends of a vertically adjustable bar have clamping engagement. As herein indicated, this clamping bar includes two complementary sections 24 connected by a plate 25, said plate having spaced longitudinally extending slots 26 to receive clamping bolts 27 threaded in the sections 24 of the adjustable bar. A stud 28 is centrally fixed in the plate 25.

A cutter shaft or spindle 29 is suitably mounted upon the upper end of the upright 23 and upon said spindle the gear cutting disk 30 is suitably secured. A cam 31 is also fixed upon the spindle 29 and is provided with spaced side flanges 32 between which the upper and lower sides of an arcuate shaped yoke 34 formed upon the upper end of a vertically reciprocating connecting rod 33 are disposed. The medial portion of this rod is provided with a longitudinally extending slot 35 through which the guide stud 28 is engaged.

A longitudinally extending slot 36 is formed in the forward end portion of the flange 9 on the plate 6, and one arm of an angular bracket member 37 is adjustably clamped against the outer face of said flange by means of the bolt 38 disposed through said slot. Upon the other arm of said bracket member, a bell crank lever 39 is pivotally mounted. One arm of this lever is provided with spaced openings, one of which is adapted to receive a bolt 40 which is vertically adjustable in a slot 41 provided in the lower end of the lever 33. The other arm of the bell crank lever is also formed with a series of spaced openings 42 to receive a bolt 43 whereby an adjustable block 44 may be mounted upon the lever arm.

The plate 12 is formed in one of its side edges with a longitudinally extending T slot 45 and an angular bracket member 46 is adjustably clamped to said plate by means of the bolt 47 which has sliding engagement in said slot. The flange 9 on the plate 6 is likewise formed with a second slot 48 to receive the clamping bolt 49 for an adjustable bracket member 50. Upon said bracket member a second bell crank lever 51 is pivotally mounted, and one arm of this lever is connected by the link 52 to the bracket member 46.

Upon the other arm of the lever 51 a cylindrical lug 53 is rotatably mounted, said lug being adapted for adjustable engagement in spaced openings 54 provided in the lever arm. This lug is formed with an opening to receive a rod 55 which is adjustably held against the shifting movement relative to the lug by means of a suitable set screw 56. One end of the rod 55 is pivotally connected to the adjustable member 44 on the arm of the bell crank lever 39.

Having above described the construction and relative arrangement of the several parts of the attachment, its operation will be understood as follows: The gear blank B having been secured in the chuck, and the chuck supporting member adjusted upon the index head in accordance with the bevel or angle of the gear face, rotation is imparted to the cutter shaft or spindle from any convenient source of power, and the machine carriage is adjusted to move the gear blank relative to the rotating cutter. The cutting action, of course, commences at the inner edge of the gear face and in the rotation of the cutter shaft or spindle, the connecting rod 33 is moved vertically through the medium of the cam 31, coacting with the yoke 34 on the upper end of said lever. Through the medium of the bell cranks and the operating connections between the same, the connecting rod and the plate 12, said plate is oscillated transversely in an arcuate path, as the cutting action progresses and the carriage is moved in a forward direction. It will be obvious that as the plate 13 is pivotally mounted at one end, as at 14, the amount of movement of this plate under the action of the bell crank lever 51 will increase toward the free end of the plate 13. Thus, where the cutter first engages with the gear blank, there will be only a very slight lateral movement, if any, the amount of this lateral movement depending upon the position of the carriage and therefore the position of the pivot 14 with reference to the cutter, then as the carriage moves forward, it will be obvious that the cutter will move relatively rearward and as the lateral stroke of the oscillating plate 13 increases toward its rear, free end, the cut between the teeth will be increased. Thus, the cut will be gradually widened toward the rear or outer edge of the gear face and the teeth will be given the proper taper. Thus in a single cutting operation across the face of the gear blank, a tooth is accurately cut and it is not necessary to perform a second cutting operation after adjusting the chuck in the index head in order to properly thin or taper the tooth. After one tooth has thus been cut, the chuck is rotated or adjusted so that the next tooth will be properly spaced from the preceding tooth. It will, therefore, be seen that in one continuous cutting operation the gear tooth is produced in its final and completed form.

The reason for forming the upper end of the connecting rod 33 with the arcuate slotted head 34 or yoke is to permit the connecting rod to rock from a vertical position as the carriage moves forward or rearward. This does not change in any way the length of stroke of this connecting rod and therefore the arc of oscillation of the plate 13, but inasmuch as the bell crank lever 39 is connected to the carriage and moves with the carriage, it is obvious that the connecting rod must tilt, but that this tilting movement should not in any way change the stroke of the connecting rod. It will be understood, of course, that the index head, the carriage, the cutter shaft or mandrel, and the cutter form no part of my invention, except in so far as they are combined therewith, but that these parts may be of any suitable construction and that they are parts ordinarily found on milling machines, but that my device consists of the cam, the reciprocating connecting rod 33, the pivoted plate 13, and the connections between the connecting rod and the plate, which comprise an attachment which is adapted to be applied to milling machines now in use.

By means of my improved attachment, bevel or miter gears may thus be very accurately cut in an expeditious manner. The attachment is applicable to the ordinary milling machine and in itself comprises relatively few parts which are easily and quickly adjustable in order to obtain the desired transverse movement or travel of the work supporting plate 12 in accordance with the diameter of the gear and the desired taper of the gear teeth.

I have herein shown and described what I have found to be a very practical embodiment of my invention, but it is to be understood that the form, construction, and mounting of the several elements, is susceptible of considerable variation, and I accordingly reserve the privilege of adopting all such legitimate changes therein as may be fairly embraced within the spirit and scope of the invention as claimed.

I claim:

1. In combination with a feed carriage, a work support mounted upon the carriage for pivotal movement at right angles to the line of movement of the carriage, a cutter and its operating shaft, and means operated from the cutter shaft to oscillate the work support and shift the work relative to the cutter in the feeding movement of the carriage.

2. A gear cutting attachment for milling machines including, in combination with the feed carriage, a gear blank support mounted upon the carriage for movement at right angles to the line of movement of the carriage, a rotary cutter, and means operatively connecting the rotary cutter to said support whereby the latter is shifted on the carriage during the cutting operation to move the gear blank relative to the cutter.

3. A gear cutting attachment for milling machines including, in combination with the longitudinally movable feed carriage, a gear blank support pivotally mounted upon the carriage for movement transversely thereof, a rotary cutter having its axis disposed at right angles to the line of movement of the carriage, and means operatively connecting said cutter to the support whereby the latter is oscillated on the carriage during the cutting operation to shift the gear blank and form a tooth therein having the requisite taper.

4. A milling machine attachment for cutting bevel gear teeth, including, in combination with the longitudinally movable feed carriage, a gear blank support pivotally mounted upon the carriage for movement transversely thereof, a rotary cutter having its axis disposed at right angles to the line of movement of the carriage, and means operatively connected to said support to oscillate the latter on the carriage during the cutting operation and shift the gear blank to form a tooth therein having the requisite taper.

5. A milling machine attachment for cutting bevel gear teeth, including, in combination with the feed carriage, a gear blank support pivotally mounted upon the carriage for movement in a line at right angles thereto, a rotary shaft, a gear tooth cutter fixed upon the shaft, a cam on said shaft, and means actuated by said cam and operatively connected to said support to oscillate the latter during the cutting operation and shift the gear blank to form a tooth therein having the requisite taper.

6. A milling machine attachment for cutting bevel gear teeth, including, in combination with the feed carriage, a gear blank support pivotally mounted upon the carriage for movement in a line at right angles thereto, a rotary shaft, a gear tooth cutter fixed upon the shaft, a cam on said shaft, a connecting rod operatively engaged by said cam and reciprocated thereby, guide means for said lever, and operative connections between said lever and said support whereby the latter is oscillated during the cutting operation to shift the gear blank and form a tooth therein having the requisite taper.

7. A milling machine attachment for cutting bevel gear teeth, including, in combination with the feed carriage, a gear blank support pivotally mounted upon the carriage for movement in a line at right angles thereto, a rotary shaft, a gear tooth cutter fixed upon the shaft, a cam on said shaft, a connecting rod operatively engaged by said cam and reciprocated thereby, guide means for said connecting rod, and a plurality of relatively adjustable elements operatively connecting the rod to said support to oscillate the latter in its cutting operation and shift the gear blank to form a tooth therein having the requisite taper.

8. A milling machine attachment for cutting bevel gear teeth, including, in combination with the feed carriage, a gear blank support pivotally mounted upon the carriage for movement at right angles to the line of movement of the carriage, a shaft, a cutter upon said shaft, a cam on the shaft, a bodily shiftable connecting rod having means on one end operatively engaged with the cam, guide means for said connecting rod, and adjustable connections between the other end of the rod and said support whereby the latter is oscillated during the cutting operation to shift the gear blank and form a tooth therein having the requisite taper.

9. In combination with a feed carriage, a cutter and its operating shaft disposed above the feed carriage, a work support mounted upon the carriage for movement approximately at right angles to the line of movement of the carriage, means oscillating the work support, and means acting automatically to shift the work support and the work laterally first in one direction and then in the other relative to the cutter in the feeding movement of the carriage.

10. In combination with a feed carriage, a cutter and its operating shaft disposed above the carriage, the cutter extending in the direction of movement of the carriage, of a work support pivotally mounted upon the carriage for oscillation approximately at right angles to the line of movement of the carriage, and means for automatically oscillating the work support and work relative to the cutter during the feeding movement of the carriage.

11. A gear cutting attachment for milling machines including in combination a longitudinally movable feed carriage, a gear blank support pivotally mounted upon the carriage for oscillation transversely thereof, a rotary cutter having its axis disposed at right angles to the line of movement of the carriage, and means automatically oscillating the carriage as the cutter is rotated to thereby oscillate the gear blank while the cutter is cutting a tooth to thereby give the tooth the requisite taper.

12. A gear cutting attachment for milling machines including in combination a longitudinally movable feed carriage, a gear blank support pivotally mounted upon the carriage for oscillation transversely thereof, a shaft extending at right angles to the line of movement of the carriage, a rotary cutter mounted on the shaft, a cam on said shaft, a connecting rod reciprocated by said cam, and pivotal connections between the connecting rod and the gear blank support causing the oscillation of the gear blank support while the cutter shaft is rotating.

13. A milling attachment for cutting bevel gear teeth including in combination with a feed carriage a gear blank support pivotally mounted upon the carriage for oscillation at right angles to the line of movement of the carriage, a shaft disposed above the carriage and extending transversely thereof, a cutter mounted upon the shaft, a cam on the shaft, a connecting rod having an arcuate slot in one end with which said cam engages to cause a reciprocation of the rod, and adjustable connections between the opposite end of said connecting rod and said gear blank support whereby the latter is oscillated during the cutting operation to cause the cutter to cut a tapering tooth on the gear blank, said operative connections being mounted upon and shiftable with the carriage.

14. In a milling machine, the combination with a longitudinally movable feed carriage, a gear blank support pivotally mounted upon the carriage for oscillation at right angles to the line of movement of the carriage, a shaft mounted above the carriage and extending transversely thereof, a rotary cutter mounted on the shaft and coacting with the gear blank, a cam mounted on the shaft, a vertically reciprocatable connecting rod having an arcuate slot at its upper end within which said cam operates to reciprocate the connecting rod, a bracket mounted upon the carriage and longitudinally adjustable therealong, a bell crank lever mounted upon the bracket and having one arm pivotally connected to the lower end of the connecting rod, a lever flexibly connected to the other arm of the bell crank and extending approximately parallel to the carriage, a longitudinally adjustable bracket mounted upon the carriage, and a bell crank lever disposed in a horizontal plane and having one arm adjustably engaging said last named rod, the other arm of the bell crank lever being operatively connected to the gear blank support to oscillate the latter.

15. In a milling machine, the combination with a longitudinally movable feed carriage, a gear blank support pivotally mounted upon the carriage for oscillation at right angles to the line of movement of the carriage, a shaft mounted above the carriage and extending transversely thereof, a rotary cutter mounted on the shaft and coacting with the gear blank, a cam mounted on the shaft, a vertically reciprocatable connecting rod having an arcuate slot at its upper end within which said cam operates to reciprocate the connecting rod, the middle portion of the connecting rod being longitudinally slotted, a relatively fixed guide pin passing through said slot, the lower end of the connecting rod being vertically slotted, a bracket mounted upon the carriage for longitudinal adjustment and moving with the carriage, a bell crank lever disposed in a vertical plane and mounted upon said bracket, a pin passing through one arm of the bell crank lever and through the slot in the lower end of the connecting rod, and operative connections between the other arm of the bell crank lever and said gear blank support whereby to oscillate the gear blank support as the connecting rod is reciprocated.

In testimony whereof I hereunto affix my signature in the presence of two witnesses.

DAVIS M. SANDERS.

Witnesses:
C. M. BISSELL,
S. W. BISSELL.

Copies of this patent may be obtained for five cents each, by addressing the "Commissioner of Patents, Washington, D. C."